April 20, 1937. W. J. DAVIDSON 2,077,825
SAFETY LATCH EQUIPPED COUPLING PIN
Filed June 23, 1936
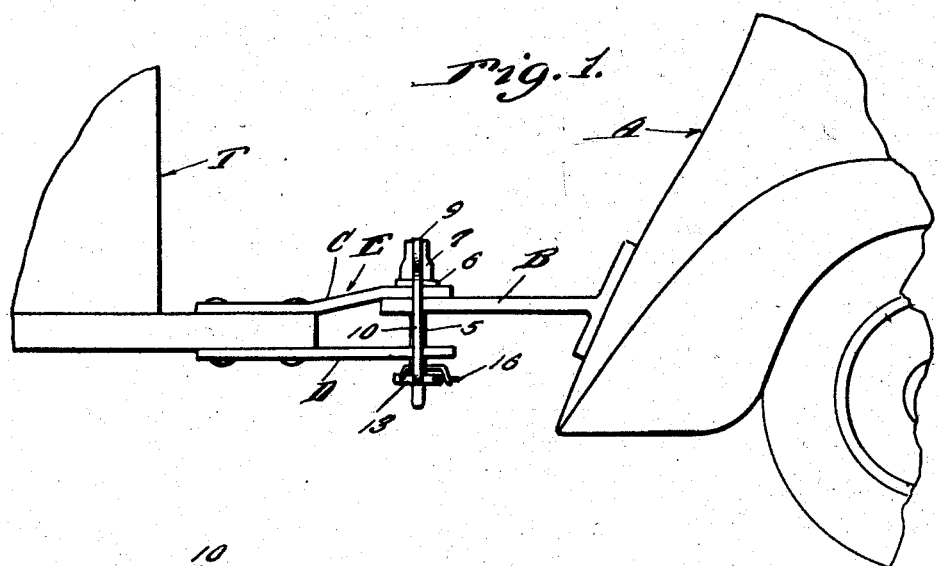
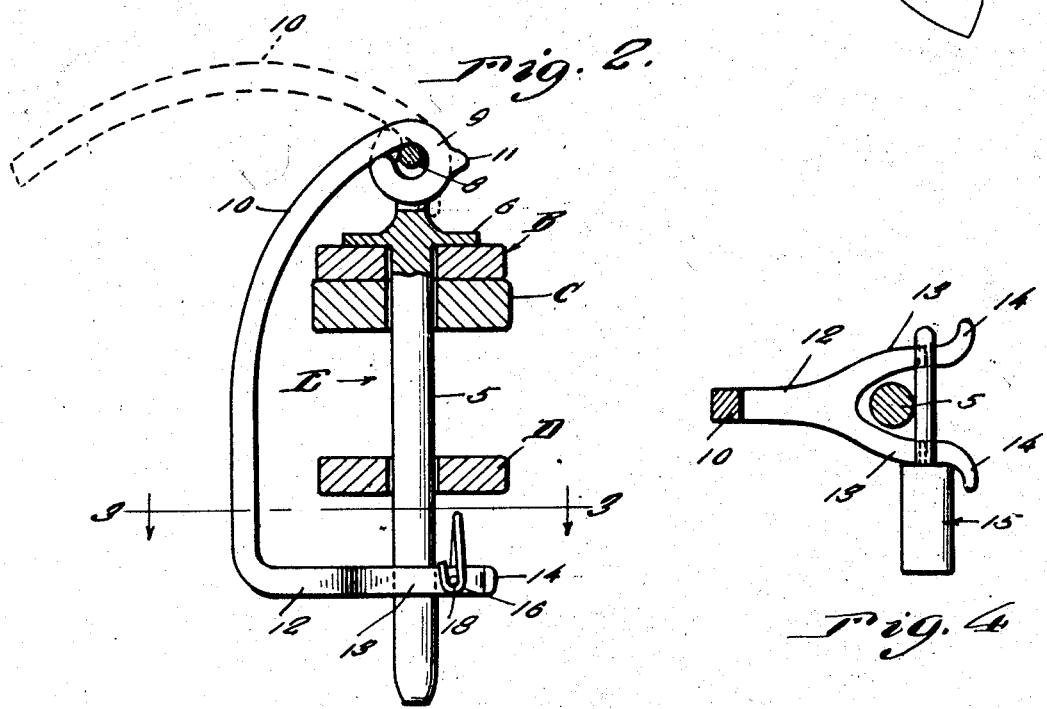
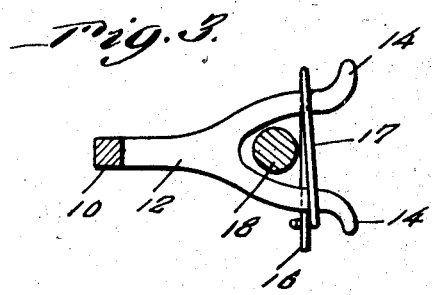
Inventor
W. J. Davidson
By Clarence A. O'Brien
Hyman Berman
Attorneys Patented Apr. 20, 1937

2,077,825

UNITED STATES PATENT OFFICE 2,077,825

SAFETY LATCH EQUIPPED COUPLING PIN

Willie J. Davidson, Wharton, Tex.

Application June 23, 1936, Serial No. 86,862

2 Claims. (Cl. 280—33.15)

This invention relates to vehicle couplings, and has more specific reference to the type utilized to hitch or join a trailer to a lead or powering vehicle, the feature of the invention having to do with a new type coupling pin and a safety retaining device therefor.

It is a matter of common knowledge to those skilled in the art pertaining to trailer couplings that they are of many different types. There is one variety, however, which embodies connectible members secured respectively to the power vehicle and trailer and joined together by a simple vertical coupling pin. Sometimes these structures embody telescopically connected pipes with registering holes to receive the coupling pin and in other instances, as shown in the drawing, include equivalent connecting bars separably attached through the instrumentality of the hand-type coupling pins.

I mention the foregoing merely to lay a foundation for the statement that the present invention is devoted to the pin and accessories used in conjunction therewith whereby said pin may be used in connection with the aforesaid simple type coupling members in a safe and reliable manner.

Briefly stated, the preferred embodiment of the invention comprises a pin whose shank portion is more or less conventional and whose upper end is especially designed to accommodate a pivoted, swing-type latch or keeper provided, if desired, with a cotter key or padlock or bolt, as the case may be.

It goes without saying that my primary aim is to generally improve upon coupling pins of this type by providing one which is essentially simple and economical, sturdy and reliable, characterized by refinement and features of distinction not heretofore employed in similar devices, and otherwise particularly and aptly fitted to accomplish the desired results.

Other features and advantages will become more readily apparent from the following description and accompanying illustrative drawing.

In the drawing, wherein like numerals are employed to designate corresponding details or parts through the views:

Figure 1 is a side elevational view showing a fragmentary portion of the trailer, the associated powering automobile or lead vehicle, the coupling bars, and the new type coupling pin and associated accessories, constructed in accordance with my invention.

Figure 2 is an enlarged section partly in elevation showing the coupling pin in detail and illustrating how it is applied and locked in place.

Figure 3 is a cross-sectional view taken approximately on the plane of the line 3—3 of Figure 2.

Figure 4 is a view like Figure 3 showing a padlock substituted for the clip-type cotter key.

Referring to Figure 1 of the drawing, the lead or powering vehicle called the automobile is denoted by the letter "A" and the trailer indicated by the letter "T". A conventional flat apertured draft or coupling bar B is connected to and projects from the rear end of the automobile between the associated members C and D of the yoke E attached to the tongue of the trailer. The bars C and D are provided with registerable holes to accommodate the quick insertible and removable coupling pin 5. Incidentally, the shank of the pin is of conventional form.

In the present instance the upper end of the pin is provided with an outstanding shoulder forming or stop flange 6 and centrally above this with an eye 7 of general U-shaped form having a straight-across or flat bight portion 8. This is to accommodate the ring-like eye 9 on the adjacent end of the keeper or latch element 10. It will be noticed that the eye 9 is provided with an outstanding abutment or lug 11 which serves to limit the swinging movement of the latch in an upward direction so that it will not swing completely over the coupling pin. This puts the latch in a convenient position to drop down by gravity to quick locking position. The lower horizontal or right angularly disposed end portion 12 of the latch is formed into a fork, the arms thereof being denoted by the numerals 13 and designed to straddle the lower end of the coupling pin 5, as shown. The extremities of the arms are flared outwardly as indicated at 14 to facilitate engagement with the pin.

The outwardly flared extensions 14 not only aid in registering the fork arms in straddling relation with the coupling pin, but they serve also as convenient retaining elements for a padlock 15, which may be used at the discretion or option of the driver. The shackle of the padlock embraces the fork arms inward of the terminals 14 so that said terminals function as guards or safety elements to aid in holding the padlock in position, that padlock in turn preventing accidental disconnection of the fork arms from the coupling pin.

Instead of using a padlock, it is possible to use a cotter key 16 which may be extended through especially bored holes in the fork arms, as shown in the drawing. The cotter key is here shown as formed with a safety clip or clasp 17 having a keeper hook 18. Obviously, however, the construction of the cotter key or the padlock is of no moment, though it is desirable, as a general proposition, to use an equivalent retaining element to be carried by the fork arms and to guard against accidental displacement thereof from the coupling pin 5.

The gist of the invention is in the provision of a coupling pin having a pivoted latch connected to the upper end thereof, the latch being shaped to fit around, that is take over, the coupling members B, and E, so that the forked end thereof may be releasably connected with the lower end of the coupling pin. Additional novelty resides in the special construction of the fork arms to accommodate the cotter key or padlock, as the case may be. Furthermore, novelty is believed to reside in the stop or shoulder forming flange 6 and the especially constructed U-type eye 7 to accommodate the ring-type eye 9 on the latch, said ring 9 being provided with a stop abutment 11 to serve in the manner described.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

Although the principal use of this coupling pin is to hitch or join a trailer to a powering vehicle, it is also useful and practical as a safe coupling pin in coupling an extension coupling pole of any vehicle, and in every other character of device which requires a safe coupling pin which will not jolt out of place, or become removed from its serviceable position.

I claim:

1. A safety latch-equipped coupling pin of the class described comprising a substantially cylindrical pin provided at its top with an outstanding flange constituting a stop shoulder, and formed above said flange with an eye, a safety retaining latch having an eye at one end pivotally connected with said first-named eye, said latch eye being provided with an outstanding lug engageable with said first-named eye to limit the lifting or swinging movement of the latch in a predetermined manner, said latch being provided at its lower end with a forked portion releasably engageable with the corresponding end of the coupling pin.

2. A safety latch-equipped coupling pin of the class described comprising a bodily insertible and removable coupling pin of cylindrical cross-sectional form provided at its upper end with an attaching eye and stop means, a latch having an eye pivotally attached to said first-named eye and provided with stop means, said latch having its intermediate portion substantially straight and disposed in parallelism with said pin, the lower end thereof being directed at right angles toward the pin and terminating in a substantially V-shaped fork, the extremities of the fork arms being flared outwardly and apertured, the outwardly flared ends being disposed in a plane with the body portions of the arms to constitute retaining hooks to accommodate the shackle of a padlock in the manner described.

WILLIE J. DAVIDSON.